United States Patent [19]

Fuschetto

[11] Patent Number: 4,647,163

[45] Date of Patent: Mar. 3, 1987

[54] PRESSURE COMPENSATED FLEXIBLE ELBOW FOR FLUID COOLED OPTICAL ELEMENT

[75] Inventor: Anthony N. Fuschetto, West Redding, Conn.

[73] Assignee: The Perkin-Elmer Corporation, Norwalk, Conn.

[21] Appl. No.: 720,114

[22] Filed: Apr. 4, 1985

[51] Int. Cl.⁴ .......................... G02B 7/18; G02B 5/08
[52] U.S. Cl. ....................................... 350/610; 285/41; 285/226
[58] Field of Search ................... 350/610, 588; 285/41, 285/226, 133, 138

[56] References Cited

U.S. PATENT DOCUMENTS 3,620,607 11/1971 Griest ..................... 350/610

Primary Examiner—Jon W. Henry
Attorney, Agent, or Firm—Thomas P. Murphy; Edwin T. Grimes; Francis L. Masselle

[57] ABSTRACT

A connector for supplying cooling fluid to an optical device without inducing jitter in the optical device. An outer housing formed as a T section has one end fixed to the optical device. An elbow disposed in the housing has an end fixed to mechanical ground. Bellows means connecting the housing and elbow and forms fluid tight volumes with the housing on each side of the elbow. Conduit means communication with the volumes fills each of the volumes with fluid flowing through the elbow which eliminates jitter of the optical device due to fluid flow.

5 Claims, 1 Drawing Figure

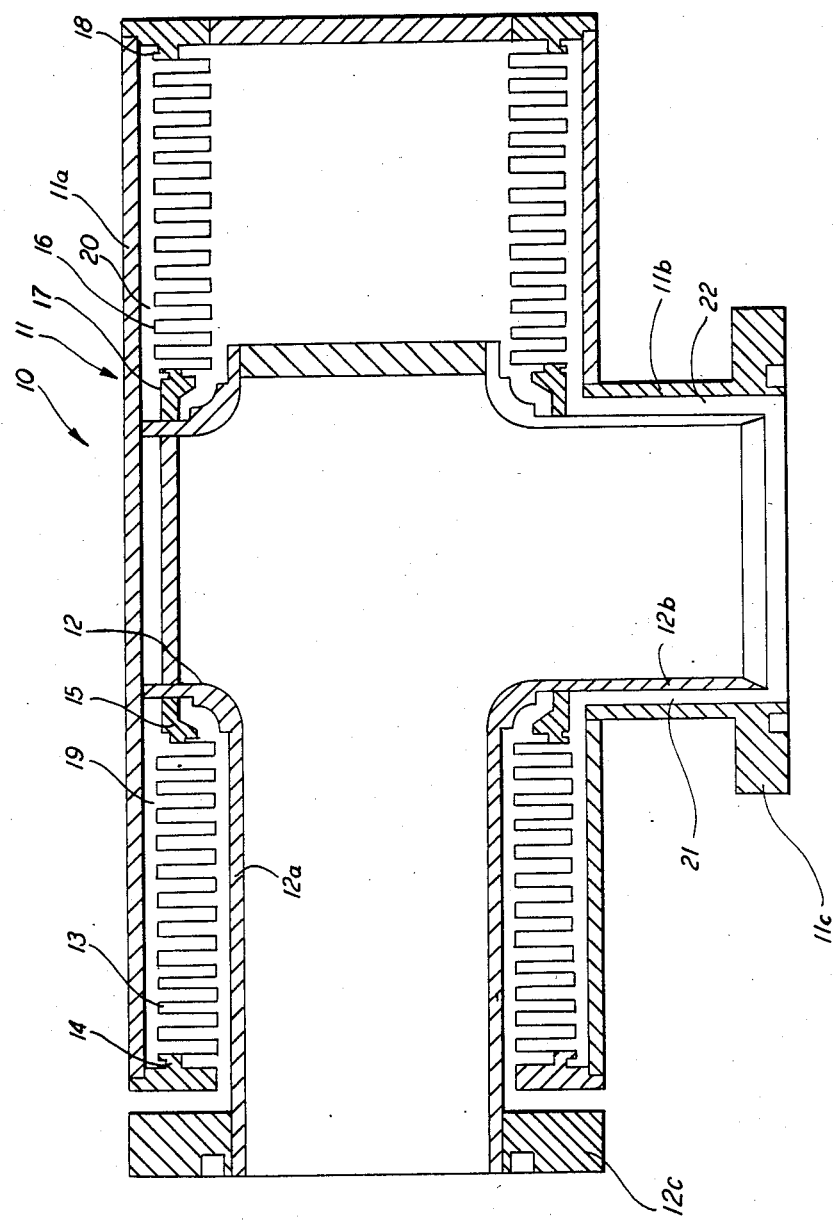

PRESSURE COMPENSATED FLEXIBLE ELBOW FOR FLUID COOLED OPTICAL ELEMENT

BACKGROUND OF THE INVENTION

Laser beam expanders and beam control systems used to direct high energy laser beams have active optical elements, namely, mirrors which absorb large amounts of heat flux. This results in rapid deterioration or destruction of the mirror surface figure thus severely reducing the density of the laser energy at the output end of the device. To avoid such a problem the mirror elements must be cooled. One method for cooling high energy laser mirrors is to circulate a cooling fluid through a myriad of channels formed in the optical device near the exposed surface. In order to maintain a low temperature gradient without which the optical device will severely distort, it is necessary that the fluid pass into and out of the optical device at a high rate, e.g., ten or more gallons of cooling fluid a minute must pass through an optical device of relatively small diameter, e.g., six inches. Such flow rates require high fluid pressures which causes instability or jitter of the optical device as the fluid flows therethrough.

The present invention relates to a fluid connector which overcomes the above problem that provides a flexible, low spring rate and frictionless fluid connection joint to cooled mirrors or other optical devices and any degree of freedom motion drive mechanism which balances out the fluid pressure forces. The advantages of the device are the mirror and/or drive mechanisms experience minimal jitter or forces due to fluid flow which is a major problem in Directed Energy Systems for maintaining precise beam alignment and pointing.

SUMMARY OF THE INVENTION

The present invention relates to pressure compensated fluid connector for supplying cooling fluid to an optical device such as a mirror. It comprises a T shaped housing having the upright section connected to the optical device to be cooled. An elbow disposed in the housing has an end fixed to mechanical ground. The elbow which is the fluid passage extends through half of the cross-section of the T shaped housing and bends into the upright section of the housing. A first bellows connects one end of the cross-section of T shaped housing to the elbow while a second bellows connects the other end of the cross-section to the elbow. The bellows form equal volumes on each side of the elbow. Conduit means in communication with the volumes fill the volumes with the cooling fluid when the cooling fluid flows through the elbow. The foregoing structure eliminates jitter or instability of the optical device during cooling. As a result of this structure, the housing, mirror end and moving end of the device see no fluid pressure forces. The static and velocity pressure force components are grounded out through the end fixed to mechanical ground. Fluid flowing through the elbow passes through it only and does not flow along edges of the bellows convolutions which would cause considerable jitter. Also, the bellows are externally pressurized which avoids squirm or instability.

BRIEF DESCRIPTION OF THE DRAWING

The FIGURE is a sectional illustration of the present invention.

DESCRIPTION

Referring now to the FIGURE there is shown the fluid connector 10 of the present invention. It comprises a T-shaped housing 11. The housing 11 may be made of any convenient material, e.g., stainless steel. The housing 11 comprises a cross-member 11a and an upright member 11b. The upright member 11b has an end flange 11c adapted to be connected to an optical device such as a mirror, e.g., of the type used in space telescopes or similar devices.

Disposed within housing 11 is an elbow 12. The elbow 12 may be made of any convenient material, e.g., stainless steel. A portion 12a of elbow 12 extends part way through cross-member 11a of housing 11. A portion 12b of elbow 11 is turned and extends through upright member 11b of housing 11. The elbow 12 has an end flange 12c adapted to be fixed to mechanical ground which in a practical embodiment of the present invention is a manifold for supplying fluid through the elbow 12 to the optical device to be cooled. Alternately, the manifold may be used to receive the cooling fluid after it has circulated through the optical device. This is mentioned inasmuch as in the optical device cooling operation, a fluid connector is used to supply cooling fluid while another identical one is used to receive the cooling fluid after it has been circulated through the optical device. This arrangement serves two purposes, one, to collect the cooling fluid and, two, to offset the force on the optical device caused by the fluid supplying connection. To accomplish this last purpose, the cooling fluid receiving connector is positioned opposite the fluid supplying connector.

A bellows 13 connects one end of housing 11 and elbow 12 at points 14 and 15, respectively. Similarly, a bellows 16 connects the other end of housing 11 to elbow 12 at points 18 and 17, respectively. The bellows 13 and 16, thus, interconnect housing 11 and elbow 12 in a flexible manner such that elbow 12 essentially floats within housing 11.

The bellows 13 and 16 form fluid tight and equal volumes 19 and 20 with housing 11.

Conduits 21 and 22 formed by portions 11b and 12b of housing 11 and elbow 12, respectively, communicate with volumes 19 and 20. The end of portion 12b of elbow 12 is somewhat shorter than the end portion 11b of housing 11 such that fluid flowing through elbow 12 fills volumes 19 and 20 via conduits 21 and 22, respectively. The foregoing arrangement causes the fluid pressure forces induced within the optical device to be balanced out. Thus, elbow 12 remains at a central or null position with respect to the flange 11c that is fixed to the optical device, thus eliminating unwanted jitter of the optical device.

Other modifications of the present invention are possible in light of the above description which should not be construed as placing any limitations on the invention described therein beyond those expressly set forth in the claims which follow:

What is claimed is:

1. A connector for supplying cooling fluid to an optical element having a labyrinth of channels formed therein for receiving the cooling fluid comprising:
   an optical element
   a housing forming a T section comprising a cross-member and upright member,
   said upright member having an end fixed to said optical element, an elbow disposed within said housing, said elbow having a first portion disposed in said cross-member and a second portion disposed in said upright section, said first portion of said elbow having an end fixed to mechanical ground, first bellow means fixed between one end of said T section and said elbow forming a fluid tight volume with said housing, second bellow means fixed between the other end of said T section and said elbow forming a fluid tight volume with said housing, conduit means connected to said volumes for filling said volumes with the cooling fluid flowing through said elbow.

2. A connector according to claim 1 wherein;

said conduit means are formed between said second portion of said elbow and said upright member of said housing whereby fluid flowing in any direction through said elbow fills up said volumes.

3. A connector according to claim 2 wherein said volumes formed by said first and second bellows means are equal.

4. A connector according to claim 3 wherein said second portion of said elbow is shorter than said upright member of said housing.

5. A connector according to claim 4 wherein said mechanical ground includes means for supplying or receiving fluid to or from said elbow.

* * * * *